July 14, 1936.  H. W. FAUS  2,047,679
SPEED INDICATOR
Filed April 26, 1932  2 Sheets-Sheet 1
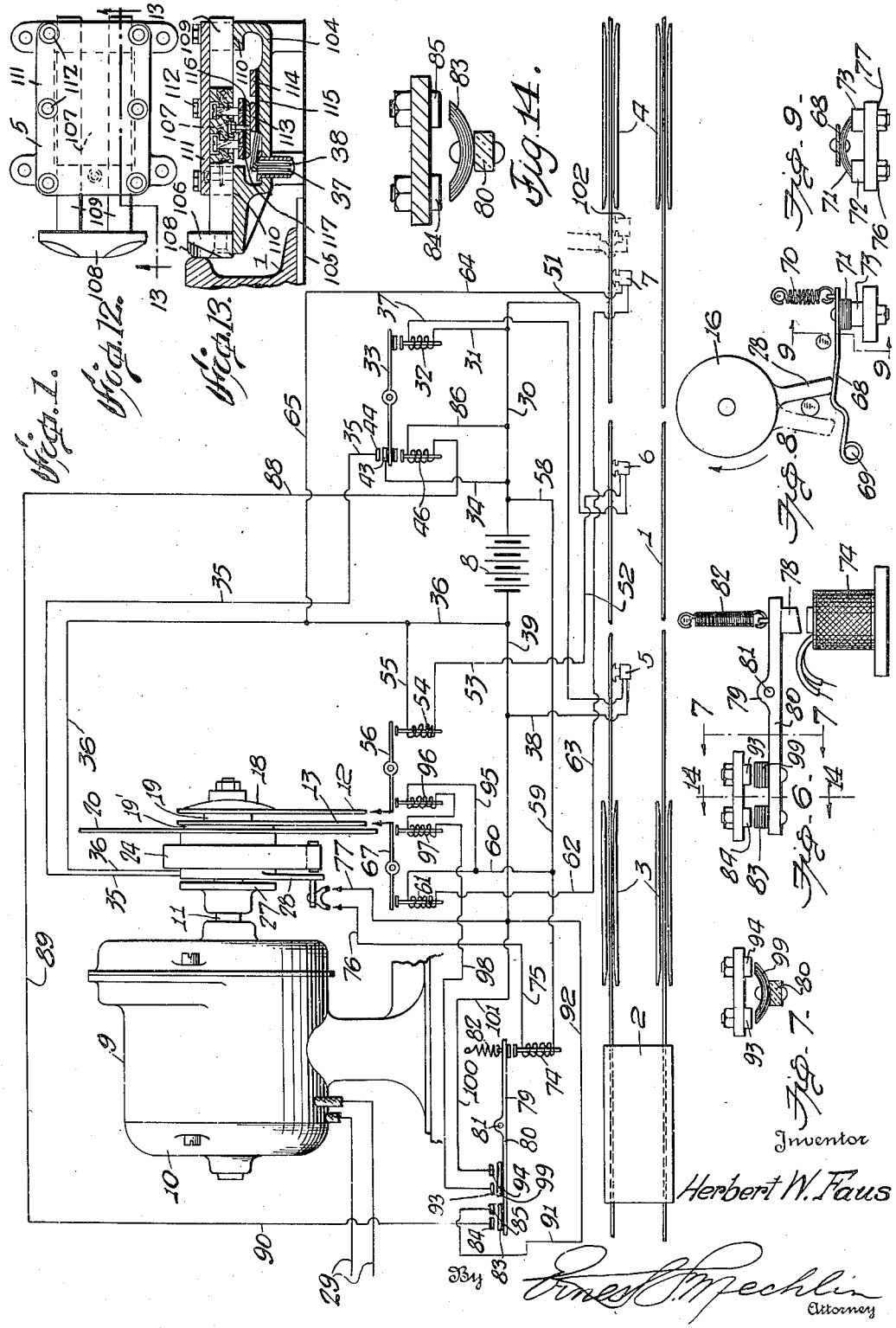
Inventor
Herbert W. Faus
By Ernest P. Mechlin
Attorney July 14, 1936.                    H. W. FAUS                    2,047,679
                                SPEED INDICATOR
                        Filed April 26, 1932            2 Sheets-Sheet 2
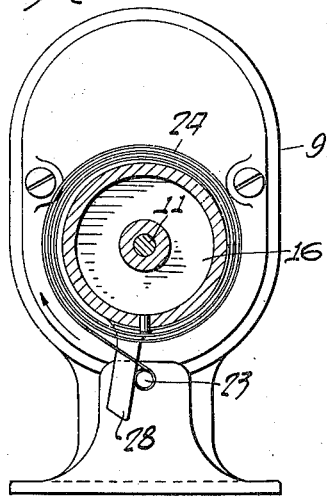
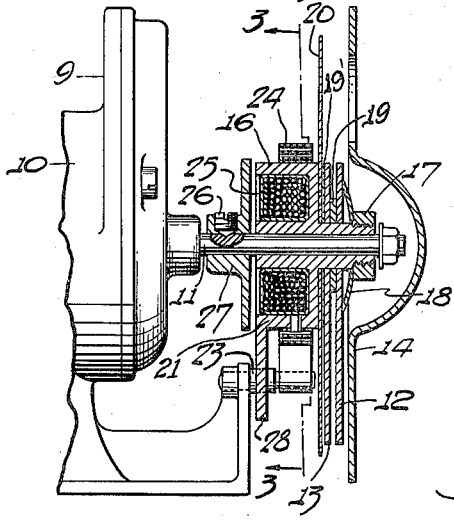
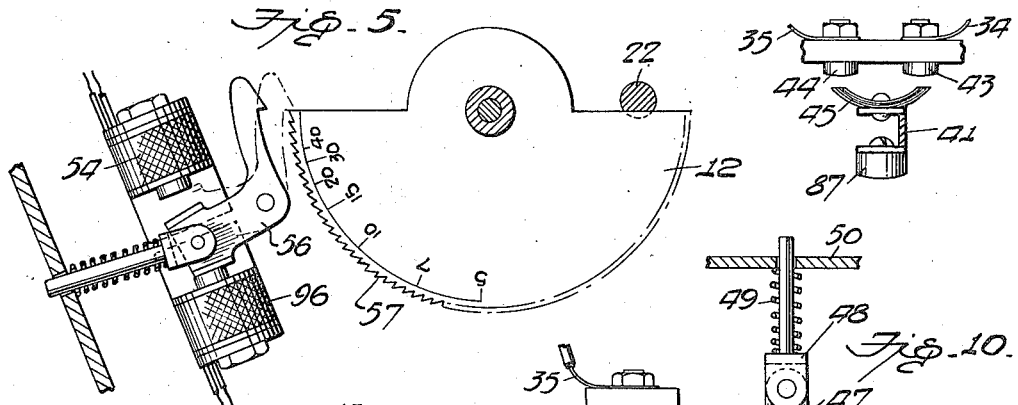
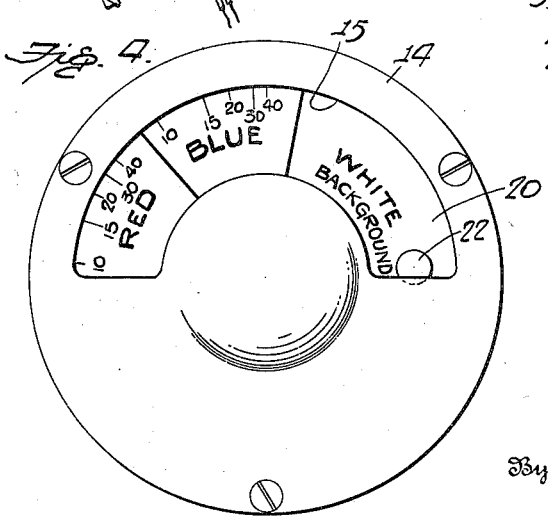
Inventor
Herbert W. Faus
By Ernest P. Mechlin
Attorney Patented July 14, 1936

2,047,679

UNITED STATES PATENT OFFICE 2,047,679

SPEED INDICATOR

Herbert W. Faus, White Plains, N. Y.

Application April 26, 1932, Serial No. 607,609

11 Claims. (Cl. 104—26)

This invention relates to speed indicators and, more particularly, to such suitable for use in connection with car retarders in freight classification yards.

The principal object of my invention, generally considered, is the provision of a speed indicator adapted to be actuated by a moving car to show the speed of said car at a distance, whereby the operator of a car retarder will know how much retarding force to apply to the car to avoid collision damage between said car and a stationary car.

Another object of my invention is the provision of a device for indicating the speed of an object having a motion translation along a predetermined path, said device comprising one or more indicator elements, mechanism adapted to move said element or elements at a constant speed, a plurality of circuit controlling devices spaced along said path and adapted to be actuated by said moving object, and a plurality of electrical circuits respectively controlled by said devices, one of said circuits including means for operatively connecting said indicator element or elements to said mechanism for the actuation thereof, and the remaining circuit or circuits including means for arresting the movement of said indicator element or elements, whereby the amount of movement of said element or elements shows the speed or speeds of said object between corresponding circuit controlling devices.

Other objects and advantages of the invention relating to the particular arrangement and construction of the various parts will become apparent as the description proceeds.

Referring to the drawings illustrating my invention, the scope whereof is defined by the appended claims:—

Figure 1 is a diagram representing a portion of a freight classification yard, a car, a plurality of car retarders, and an apparatus embodying my invention for showing the speed of a car in said yard.

Figure 2 is a fragmentary view, partly in elevation and partly in longitudinal vertical section, of the motor driven speed indicating device.

Figure 3 is a transverse sectional view on the line 3—3 of Figure 2, looking in the direction of the arrows.

Figure 4 is a fragmentary end elevational view of the motor driven speed indicator.

Figure 5 is a fragmentary view showing one of the indicator elements or disks and the means for arresting movement thereof.

Figure 6 is a side elevational view of the magnetic switch for releasing the disk drive and disk brakes.

Figure 7 is a transverse sectional view on the line 7—7 of Figure 6, looking in the direction of the arrows.

Figure 8 is a fragmentary elevational view of the return switch.

Figure 9 is a transverse sectional view on the line 9—9 of Figure 8, looking in the direction of the arrows.

Figure 10 is a side elevational view of the magnetic switch for the disk drive magnet.

Figure 11 is a fragmentary transverse sectional view on the line 11—11 of Figure 10, looking in the direction of the arrows.

Figure 12 is a plan of one form of contact device which may be employed.

Figure 13 is a fragmentary transverse sectional view on the line 13—13 of Figure 12, showing the device assembled with a section of rail.

Figure 14 is a transverse sectional view on the line 14—14 of Fig. 6, looking in the direction of the arrows.

In order to control the movement of cars in a railway car classification yard, it has been customary to use track brakes or car retarders controlled from a distance, as by an operator in a tower. This tower is usually positioned near a retarder so that the operator can estimate, with fair accuracy, the speed at which a car leaves said retarder. The operator, however, cannot guess with much accuracy what the speed of the car will be when it arrives at a second or final retarder which would be spaced a considerable distance from the first retarder and tower, so that he might not apply the proper braking action to the car to avoid releasing it from said retarder at such a high speed that damage would result upon its colliding with another car standing on the track beyond the second retarder.

It is one of the purposes of my invention to provide indicator means operated automatically by railway vehicles or cars moving in a yard and approaching a car retarder to show an operator, stationed at a distance from the retarder, the speed at which the car is travelling as it approaches the retarder, so he will know how much braking action to apply thereto.

Referring to the drawings in detail, like parts being designated by like reference characters, there is shown a section of track 1, which track may be in a freight classification yard, and a car 2 moving thereon toward a car retarder 3, which we will consider as the first car retarder. Beyond car retarder 3, at a considerable distance, is a second car retarder designated by the reference character 4. It is assumed that the operator of the car retarders 3 and 4 is stationed near the first car retarder numbered 3, as in a tower (not shown).

The track between car retarders 3 and 4, in the present embodiment, has a plurality of contact devices spaced equidistantly therealong, or substantially so, and adapted to be successively closed by a car passing from car retarder 3 to car retarded 4. The first contact device is designated by the reference character 5, the second by the numeral 6, and the third by the character 7. All of these devices are electrically connected to a source of electric current, as, for example, a battery 8, for the purpose of controlling the operation of a speed indicator, generally designated by the reference character 9.

In the present embodiment, the speed indicator comprises a synchronous motor 10 driving through reduction gearing (not shown) a shaft 11 at substantially constant speed. Although an electric motor is shown in the present embodiment, it will be understood that other forms of clock mechanism may be employed, if desired. The shaft or spindle 11 is preferably turned at a relatively low rate of speed, such, for example, as at abount one revolution per minute. On the shaft 11 are mounted an outer loose disk 12 and an inner loose disk 13, which disks may be either approximately semicircular, except for the hub portions, as shown in Figure 5, or circular. If circular or full disks, they would be of transparent material, one half of each being differently colored. In the preferred embodiment illustrated, each disk is semicircular, the outer disk being colored, for example, red, and the inner disk being colored, for example, blue.

The indicator 9 has a face or cover 14 having a sector cut out to leave a semicircular opening 15 through which portions of the disks 13 and/or 12 are visible at certain times.

The disks 12 and 13, which when in neutral position do not show through the opening 15, although normally loose on the shaft, are frictionally engaged with a normally loose hub member 16, as by being pressed thereagainst by a nut 17 acting on a spring 18 which presses the outer disk 12 against an intermediate washer 19, inner disk 13, washer 19', background disk 20, and enlarged portion 21 of the hub 16. The hub 16 and associated frictionally driven disks 12 and 13 are held in neutral or normal position against disk stop means 22 and hub stop means 23 by a spiral spring 24, as shown most clearly in Figure 3.

The hub 16 is preferably constructed of soft iron and has incorporated therewith an electrical winding forming an electromagnet or electromagnetic clutch 25 adapted to be energized by electric current. Fixed on the shaft 11, as by means of a set screw 26, is a flanged iron member or disk 27 which functions as an armature for the magnet 25, so that upon energization thereof the hub 16 grips the member 27 and rotates with the shaft 11 until the cam portion 28 on the hub has rotated in the direction of the arrow from the position shown in Figure 3 to that shown in full lines in Figure 8, where it closes a switch, to be subsequently described, for effecting return to the original position.

Let it now be assumed that the motor 10, connected to a source of alternating current by leads 29, is driving the shaft in the direction of the arrow, or clockwise as viewed in Figure 3, at constant speed, and that the battery 8 is connected to the circuits and various switches and disk brakes as shown in Figure 1. As the car 2 leaves retarder 3 and closes the contact device 5, electric current passes from the battery 8 through the lead wires 30 and 31, energizing magnet 32, effecting operation of the magnetic switch 33 to close the circuit from the battery 8 through lead wires 30, 34, and 35, magnetic clutch 25, and lead wire 36, back to the other pole of the battery 8. The full circuit for energizing the magnet 32 is through lead wires 30, 31, magnet 32, lead wire 37, contact device 5, lead wire 38 and lead wire 39, to the other pole of the battery 8. The magnetic switch 33 is shown in detail in Figures 10 and 11 and comprises the magnet 32 which acts on the associated armature 40 to rotate the lever 41 pivoted about an axis 42 to cause the other end of said lever to connect the lead wires 34 and 35 by bridging the contacts 43 and 44 by a conducting element 45. The other magnet 46 associated with the armature 87 is for the purpose of breaking the circuit through the conducting element 45, when desired, as will be subsequently described.

The lever 41 preferably has an extension 47 to which is pivoted a guide member 48 carrying a spring 49 acting between the pivoted end of said member 48 and a stop 50 so as to form a toggle, causing the lever 41 to maintain the circuit through the lead wires 34 and 35 closed, after momentary actuation of the magnet 32, until actuation of the magnet 46, when the circuit will be kept open until re-energization of the magnet 32.

The energization of the electrical winding producing the magnetic clutch 25 causes the hub portion 16 to rotate with the shaft 11 and frictionally move both the red disk 12 and the blue disk 13, so that upon closing of the first contact, a red sector of steadily increasing angularity will appear in the window opening 15.

When the car actuates the track contact 6, a circuit is completed from the battery 8 through lead wire 30, lead wire 51, contact device 6, lead wire 52, lead wire 53, electromagnet 54 and back to the battery through lead wires 55 and 36. This actuation of the electromagnet 54 pulls the disk brake or motion arresting device 56 from the full line position shown in Figure 5 to the dot-dash line position thereof, where it clutches the toothed edge 57 of the disk 12 to arrest the movement thereof. The disk brake 56 is preferably connected up with a spring toggle like the lever 41 of the electric switch 33 so that it will stay in either braking or released position in accordance with the energization of one associated magnet or the other. It will be understood that inasmuch as the disks 12 and 13 are pressed by the spring 18 with only a slight amount of force, either or both of said disks may be stopped without preventing the hub 16 from revolving.

When the car reaches and closes contact 7, an electric circuit is completed through the lead wires 30, 58, 59, 60, electromagnet 61 and lead wires 62, 63, contact device 7, lead wires 64, 65, 36, and 39 to the other pole of the battery 8. The energization of electromagnet 61 operates a disk brake 67, for the blue disk 13, corresponding with the disk brake 56 for the red disk 12 and thereby stops or arrests the movement of the blue disk 13 which, since the stopping of the red disk, has been moving from behind the red disk and producing a blue sector of steadily increasing angularity alongside the now stationary red sector.

Although in the previous discussion I have referred to red and blue sectors, it will be understood that pointers rather than sectors might be employed, as a function of the indicator is to provide a comparison of the angular relation between the indicating elements 12 and 13 as the amount the red indicating element 12 moves, and the amount the blue indicating element 13 moves with respect to the red indicating element represent, respectively, the amounts of time consumed when the car passes from the contact device 5 to the contact device 6, and when the car passes from the contact device 6 to the contact device 7. From this, it will be clear that if the red sector showing, at the time the movement of the blue disk has been arrested, is greater than the blue sector, the speed of the car has accelerated in passing from the first to the second retarder, or from contact 5 to contact 7, whereas if a larger blue sector shows, one will know that the speed of the car has been retarded in passing from one retarder to the other. Inasmuch as one will be able to judge the speed of the car as it passes the tower and through the first retarder, he will from this be able to approximate the speed of the car as it reaches the second retarder so as to know how much braking force to apply thereto.

If it is desired to know the absolute speed of the car rather than merely whether the car has increased or decreased in speed in passing from one retarder to another, the disks 12 and 13 can be calibrated, as shown in Figure 4, so that the speed in miles per hour can be read at the extreme left edge of the visible portions of said disks. Inasmuch as the extent of the disks showing represents time, the graduations on the disks representing miles per hour will be laid off proportionately to the reciprocals of the circumferential dimensions of the disks. In other words, the point on each disk representing a certain speed in miles per hour will be one-half the distance from the right-hand edge of the disk that another point representing half that speed is disposed. To make the matter clearer by an example, it will be seen that the point on the disk representing a speed of ten miles per hour is twice as far from the extreme right-hand edge of the disk as the point representing a speed of twenty miles per hour, and the point on the disk representing a speed of forty miles per hour is half way between the twenty mile point and the extreme right-hand edge of the disk considering the showing of Figure 4. It will, therefore, be clear that for a given motor speed and distance between the contacts 5, 6, and 7, the disks 12 and 13 may be calibrated to show the average speed of the car between the respective contacts so that with such a calibration it would not be absolutely necessary to use more than one disk, which disk would show the desired speed of the car adjacent the second retarder 4.

To reset the various switches, brakes and disks, I employ, in the embodiment illustrated, a cam 28 which is revolved by the hub 16 until it reaches the full line position shown in Figure 8, where it engages the switch 68 pivoted at 69 and forces it against the tension of its associated spring 70 to bridge the conducting element 71 thereof across the contacts 72 and 73 to close the circuit from the battery 8 through the lead wires 30, 58, 59, electromagnet 74, lead wires 75, 76, bridging element 71, lead wires 77 and 39, back to the other pole of the battery 8. The electromagnet 74 pulls the armature 78 of magnetic switch 79, turning the lever 80 thereof about the pivot 81 against the spring 82 and closing the following circuits.

The engagement of the bridging conductor 83 on the lever 80 with the contacts 84 and 85 closes a circuit from the battery 8 through the lead wires 30, 86, electromagnet 46, lead wires 88, 89, 90, bridging conductor 83, lead wires 91, 92, 77 and 39, to the other pole of the battery 8. The energization of the electromagnet 46 opens magnetic switch 33, breaking the circuit through the magnetic clutch 25, and stopping the rotation of the hub 16 and disks 12 and 13, allowing the return spring 24 to restore the hub and associated disks to original position inasmuch as the disk brakes 56 and 67 are simultaneously released, as will now be explained.

Upon bridging the contacts 93 and 94 by the actuation of the switch 79, a circuit is completed from the battery 8 through the lead wires 30, 58, 59, 60, 95, electromagnet 96, electromagnet 97, lead wire 98, contact 93, bridging piece 99 on switch 79, contact 94, and lead wires 100, 101, and 39, to the other pole of the battery. The energization of the electromagnets 96 and 97 effects the release of the associated disk brakes or devices 56 and 67 which had previously arrested or checked the motion of the disks or indicating elements 12 and 13. The device is then ready to repeat the afore-described cycle upon movement of another car from the first retarder past the various contacts to the second retarder.

From the foregoing description, it will be appreciated that I have devised an indicator actuated automatically by movement of an object or car, along a predetermined path or track and showing at a distance from said car if the indicating element or elements is or are calibrated, the absolute average speed of the car between fixed points, and, in any event, showing graphically and directly the relative amounts of time for the car to travel equal distances on adjacent sections of track, so that the change in speed, or continuance at uniform speed, can be immediately noted, the device automatically resetting itself for another car. Although in the preferred embodiment illustrated I have shown the resetting switch actuated by the hub on the motor upon turning nearly a complete revolution, yet it will be understood that, if desired, resetting may be effected by a fourth contact device 102 closed by the car after passing the contact device 7 and allowing a reasonable amount of time after the stopping of the blue disk to read either the speed of the car or note the change in speed or continuance of the car at uniform speed so that the track retarder operator may be in a position to intelligently actuate the second retarder.

Each of the contact devices 5, 6, 7, and 102 may be constructed as shown in detail in Figures 12 and 13. In said figures, the contact device 5, illustrated by way of example, comprises a housing 104 mounted on a railway tie 105, for example, and supporting a wheel flange engaging element 106, normally urged into engagement with a rail 1, as by means of a helical spring 107. The rail-engaging device 106 may comprise a head 108, which actually contacts with the rail and is forced therefrom by a wheel flange when the car passes thereover, and a pair of bars 109 slidably mounted in corresponding notches 110 in the housing 104 and held in place by the housing cover plate 111 secured thereover as by means of tap bolts 112.

The housing 104 carries spaced contacts 113 and 114 electrically separated therefrom by insulation 115 and respectively connected to lead wires 37 and 38. The slidable bars 109 carry a circuit closing block 116 electrically separated therefrom by insulation 117 and normally engaging the contact 113. When, however, a car passes over the contact device 5, a wheel flange moves the head 108 to the right, as viewed in Figure 13, causing the contact block 116 to bridge the space between the contact pieces 113 and 114, closing the circuit between the lead wires 37 and 38. After the car passes, the spring 107 returns the sliding element 106 of the contact device to its normal position in engagement with the rail 1, thereby again opening the circuit. Although I have only described in detail the contact device 5, it will be understood that contact devices 6, 7, and 102 may be identical, and serve to complete their associated circuits in a similar manner.

Although preferred embodiments of my invention have been disclosed, it will be understood that modifications may be made within the spirit and scope of the appended claims.

I claim:—

1. In a device for indicating the speed of a moving object, the combination with a plurality of adjacent relatively movable indicator elements, of mechanism for moving each of said elements at substantially constant speed, means controlled by said moving object for operatively connecting said indicator elements to said mechanism to cause said elements to move simultaneously, means controlled by said moving object for arresting the movement of one of said indicator elements to enable another thereof to shift its position relatively thereto, and means controlled by said moving object for arresting relative movement of said indicator elements.

2. In a device for indicating the speed of a moving object, the combination with a plurality of adjacent relatively movable indicator elements, of mechanism for moving each of said indicator elements at substantially constant speed, and a plurality of means adapted to be successively actuated by said moving object for controlling the movements of said indicator elements, one of said means serving to effect operative connection of said indicator elements to said mechanism, another of said means subsequently acting to arrest the movement of one of said indicator elements, and still another of said means thereafter acting to arrest relative movement between said indicator elements.

3. In a device for indicating the speed of a moving object, the combination with a plurality of adjacent relatively movable indicator elements, of motor mechanism adapted to move said indicator elements at a predetermined speed, means adapted to be actuated by said moving object for operatively connecting said indicator elements to said motor mechanism to cause said elements to be simultaneously actuated by said mechanism, and a plurality of successively operating means for respectively arresting motion of said indicator elements.

4. In a device for indicating the speed of an object having a motion of translation along a predetermined path, the combination with a plurality of adjacent relatively movable indicator elements, of motor mechanism adapted to move said indicator elements at substantially equal constant speeds, a plurality of circuit controlling devices arranged at predetermined intervals along said path and adapted to be actuated by said moving object, and a plurality of electrical circuits respectively controlled by said devices, one of said circuits including means for operatively connecting said indicator elements to said motor means to cause said elements to be simultaneously actuated thereby, and the remaining circuits each including means for arresting the movement of one of said indicator elements.

5. In a device for indicating the speed of an object having a motion of translation along a predetermined path, the combination with a calibrated indicator disk, of motor mechanism adapted to actuate a shaft at substantially constant speed for producing angular rotation of said disk to expose an increasingly greater area thereof, a plurality of circuit controlling devices spaced along said path and adapted to be actuated by said moving object, a plurality of electric circuits respectively controlled by said devices, one of said circuits including means for operatively connecting said disk to said shaft to cause it to be moved, and the remaining circuit including means for arresting the movement of said disk.

6. In a device for indicating the speed of an object having a motion of translation along a predetermined path, the combination with a plurality of adjacent relatively movable indicator elements, of a shaft running at constant speed and adapted to move said elements, three circuit closing devices arranged at predetermined substantially equal intervals along said path and adapted to be actuated by said moving object, and a plurality of electric circuits respectively controlled by said devices, one of said circuits including means for operatively connecting said indicator elements to said shaft to cause said elements to be simultaneously actuated thereby, and the remaining circuits each including means for sequentially arresting the movement of said indicator elements for showing the speed and relative speed of said object when travelling between said circuit controlling devices.

7. In combination, a section of track, two electrical contact devices spaced a predetermined distance along said track and adapted to be successively closed by a passing car, and an indicator controllable by said contact devices, said indicator comprising a shaft rotating slowly at substantially constant speed, a hub with an electromagnetic clutch to cause it to rotate with said shaft but normally loose thereon and resiliently held in neutral position, a calibrated indicating disk adapted to be rotated frictionally by said hub, means for stopping said disc, and wiring electrically connecting said contact devices to said indicator and disk-stopping means so that; upon a car moving along said track and closing the first contact, the clutch actuates the hub and causes said disk to rotate, and upon closing the second contact the disk-stopping means operates to stop said disk, whereby the angular movement of said disk shows the average speed of the car on the section of track between said contact devices.

8. In combination, a section of track, three electrical contact devices spaced substantially equidistant along said track and adapted to be successively closed by a passing car, and an indicator controllable by said contact devices, said indicator comprising a shaft rotating slowly at substantially constant speed, a hub with an electromagnetic clutch to cause it to rotate with said shaft but normally loose thereon and resiliently held in neutral position, an outer and an inner indicating disk adapted to be rotated frictionally by said hub, means for individually stopping said disks, and wiring electrically connecting said contact devices to said indicator and disk-stopping means so that; upon a car moving along said track and closing the first contact, the clutch actuates the hub and causes both disks to rotate, upon closing the second contact the outer disk-stopping means operates to stop said disk, and upon closing the third contact the inner disk-stopping means operates to stop said disk, whereby the relative angularity of said disks compares the time taken for the car to travel from the first to the second contact device with that to travel from the second to the third contact device, and means for resetting upon turning of the hub a predetermined amount.

9. In a freight classification yard, in combination, a car retarder, and a calibrated disk operated by a moving car to expose an area thereof, which area is inversely proportional to the speed of said car, for indicating said speed to an operator at a distant point to enable said operator to actuate the retarder to a desired extent.

10. In combination with a railway track divided into two sections of substantially equal length, electrical contact devices positioned, respectively, at the beginning of the first section, the junction between sections and the end of the second section, and an indicator operated upon actuation of said contact devices by a moving car, said indicator comprising a pair of motor driven coaxially rotating disks, marked so that their movements from normal positions are observable, the rotation of both of which is started at substantially uniform speed when the car actuates the first contact device, the rotation of one of said disks being stopped when the car actuates the second contact device, and the rotation of the second disk being stopped when the car actuates the third contact device, whereby the relative angularity of said disks shows an observer the relative length of time for the car to travel the first section of track as compared with that to travel the second section of track.

11. In a freight classification yard, in combination, a plurality of adjacent relatively movable indicator elements, means to start said elements rotating at substantially constant speed from the same angular positions when a car moving in said yard reaches one end of a section of track, means to stop one of said elements when the car reaches the other end of said section, and means to stop the other element when the car has reached the far end of a contiguous section of track of the same length, whereby the average speed of the car while traveling over the sections of track may be determined by comparing the final relative angular positions of said indicator elements.

HERBERT W. FAUS.